United States Patent
Liet

(10) Patent No.: US 11,353,397 B2
(45) Date of Patent: Jun. 7, 2022

(54) APPARATUS FOR PROCESSING CROP, ANIMAL FEED OR COMPONENTS, ELECTRONIC NIR SENSOR SYSTEM AND CALIBRATION METHOD

(71) Applicant: Trioliet B.V., Oldenzaal (NL)

(72) Inventor: Robert Jan Liet, Oldenzaal (NL)

(73) Assignee: Trioliet B.V., Oldenzaal (NL)

( * ) Notice: Subject to any disclaimer, the term of this patent is extended or adjusted under 35 U.S.C. 154(b) by 202 days.

(21) Appl. No.: 16/798,312

(22) Filed: Feb. 22, 2020

(65) Prior Publication Data
US 2020/0309685 A1 Oct. 1, 2020

(30) Foreign Application Priority Data
Mar. 25, 2019 (EP) ..................................... 19164921

(51) Int. Cl.
*G01J 5/02* (2022.01)
*G01N 21/359* (2014.01)
*G01N 21/3563* (2014.01)

(52) U.S. Cl.
CPC ....... *G01N 21/359* (2013.01); *G01N 21/3563* (2013.01); *G01N 2201/101* (2013.01); *G01N 2201/127* (2013.01); *G01N 2201/13* (2013.01)

(58) Field of Classification Search
CPC ............. G01N 21/359; G01N 21/3563; G01N 2201/101; G01N 2201/127; G01N 2201/13; A01K 5/004
See application file for complete search history.

(56) References Cited

U.S. PATENT DOCUMENTS

| | | | |
|---|---|---|---|
| 4,970,695 A | 11/1990 | Huau | 367/13 |
| 5,991,025 A | 11/1999 | Wright et al. | 356/328 |
| 2007/0236692 A1 | 10/2007 | Schebesta et al. | 356/306 |
| 2008/0186487 A1 | 8/2008 | Kormann et al. | 356/328 |
| 2011/0007319 A1 | 1/2011 | Correns et al. | 356/445 |
| 2018/0160718 A1 | 6/2018 | Liet | A23N 17/007 |

FOREIGN PATENT DOCUMENTS

| | | |
|---|---|---|
| DE | 102007061213 | 6/2009 |
| EP | 1740928 | 1/2007 |
| EP | 1956361 | 8/2008 |
| EP | 3332635 | 6/2018 |
| JP | H10197341 A * | 7/1998 |
| WO | WO 9958959 | 11/1999 |

OTHER PUBLICATIONS

Search Report from corresponding European Application No. 19164921.9 dated Sep. 5, 2019; 2 pages.

* cited by examiner

*Primary Examiner* — Kiho Kim
(74) *Attorney, Agent, or Firm* — Fattibene and Fattibene LLC; Paul A. Fattibene

(57) ABSTRACT

An apparatus for processing crop, animal feed or components with a drivable tool and at least one NIR sensor system for determining at least feed values, having a scanning head with a spectrometric sensor and at least one light source behind a transparent pane which can be passed by the feed, comprises in a housing of the NIR sensor system a calibration surface, the appearance of which is different from the appearance of the feed to be scanned on the pane, wherein the scanning head is actively adjustable for calibration between a scanning position aligned with the pane and a calibration position aligned with the respective calibration surface.

28 Claims, 15 Drawing Sheets

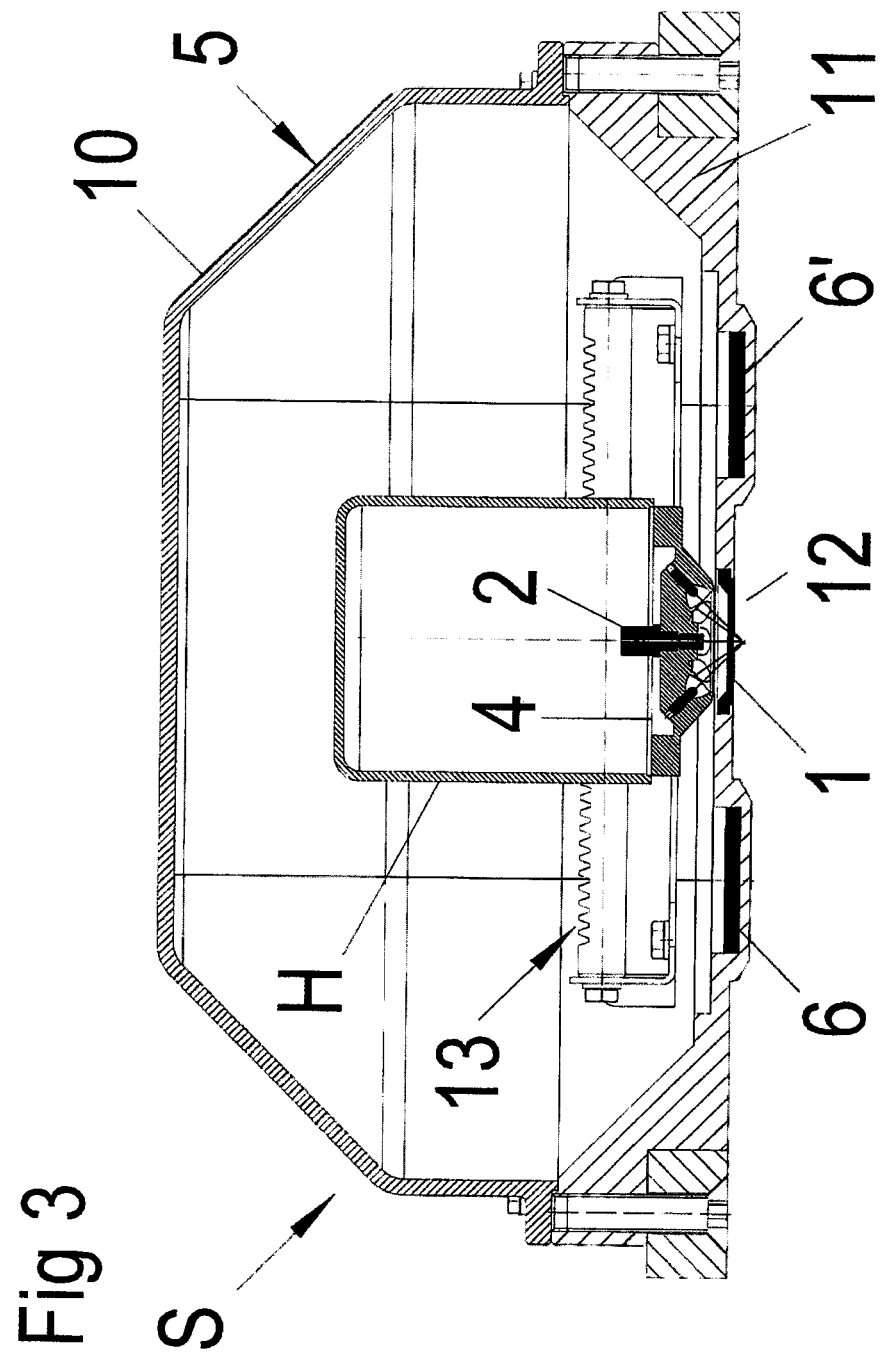

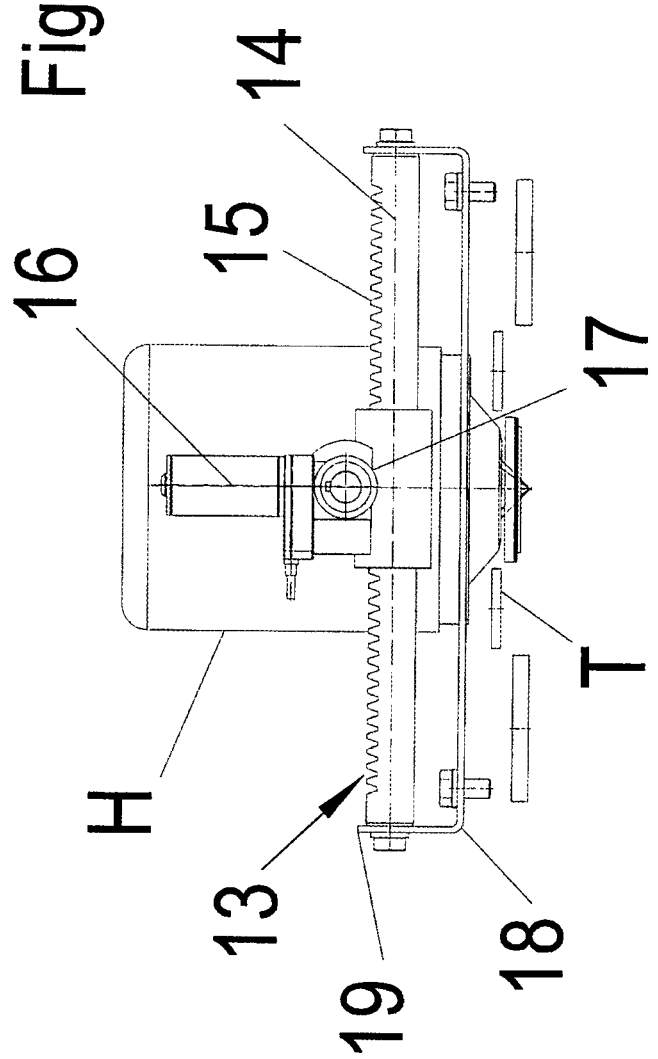

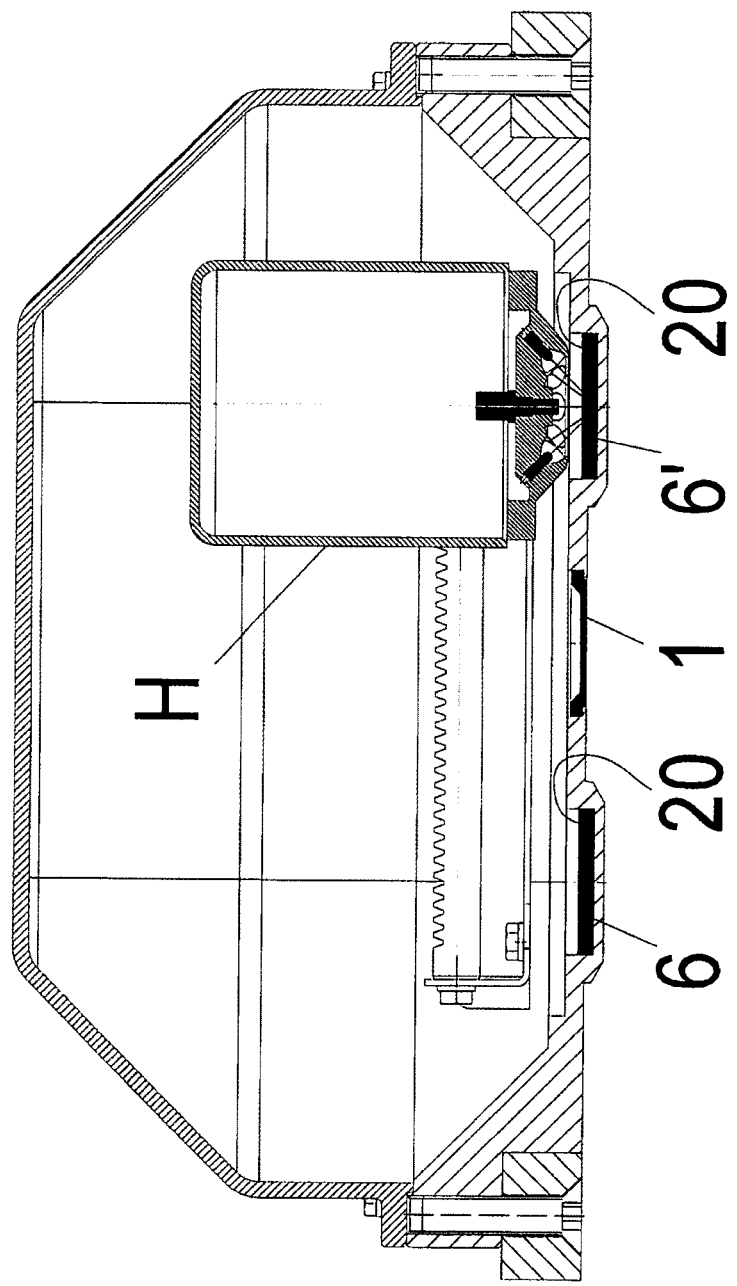

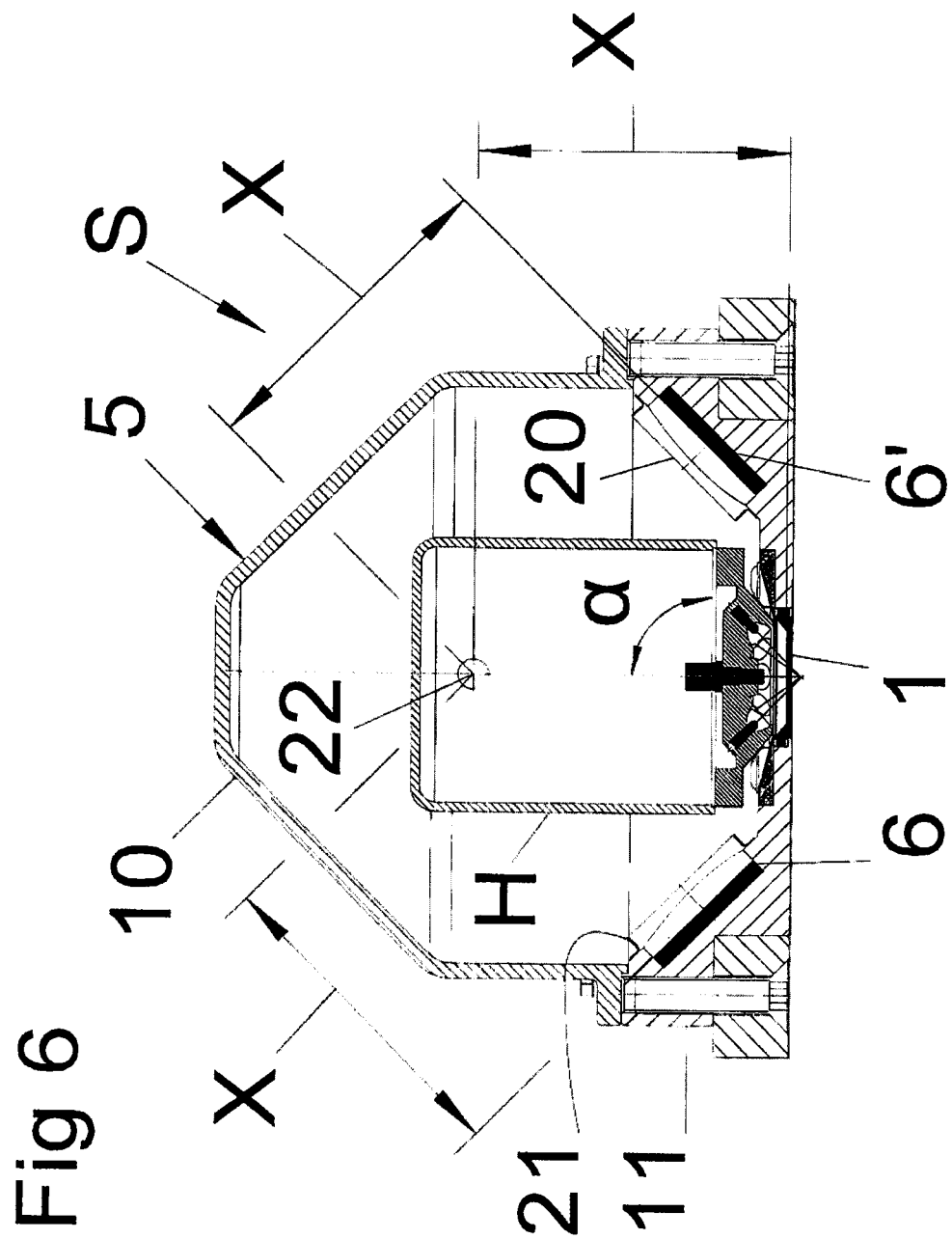

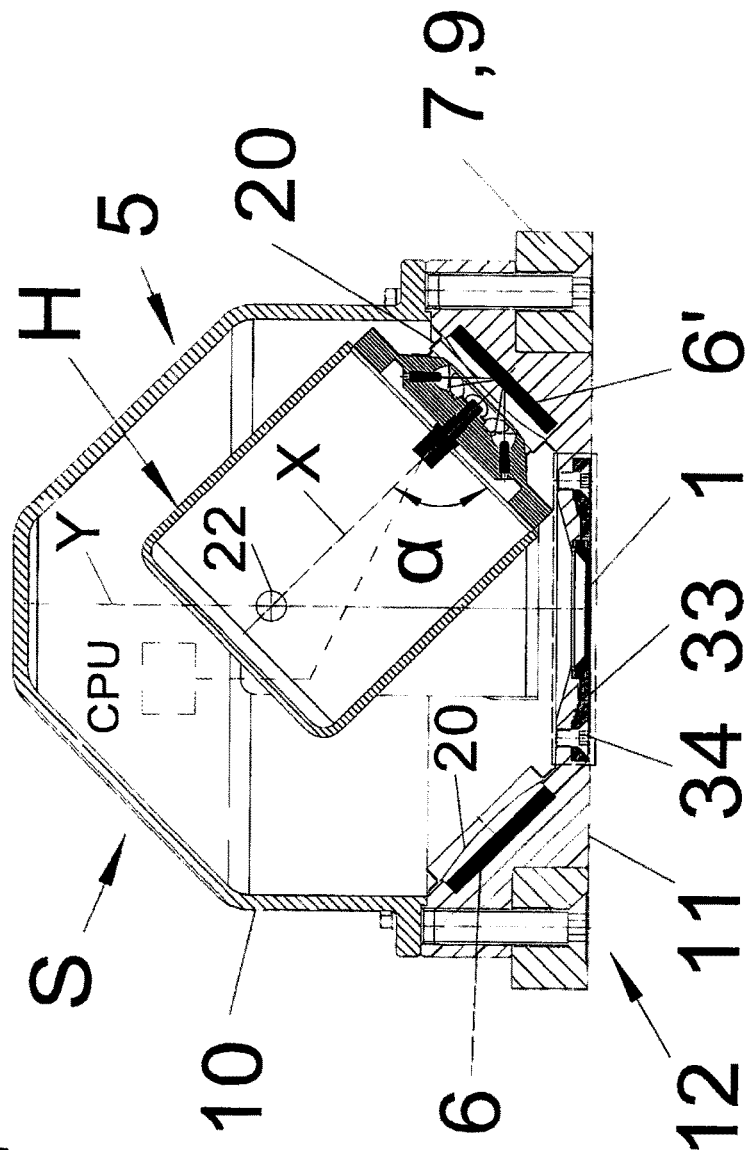
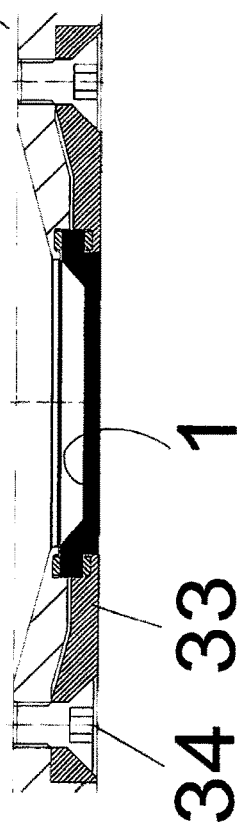

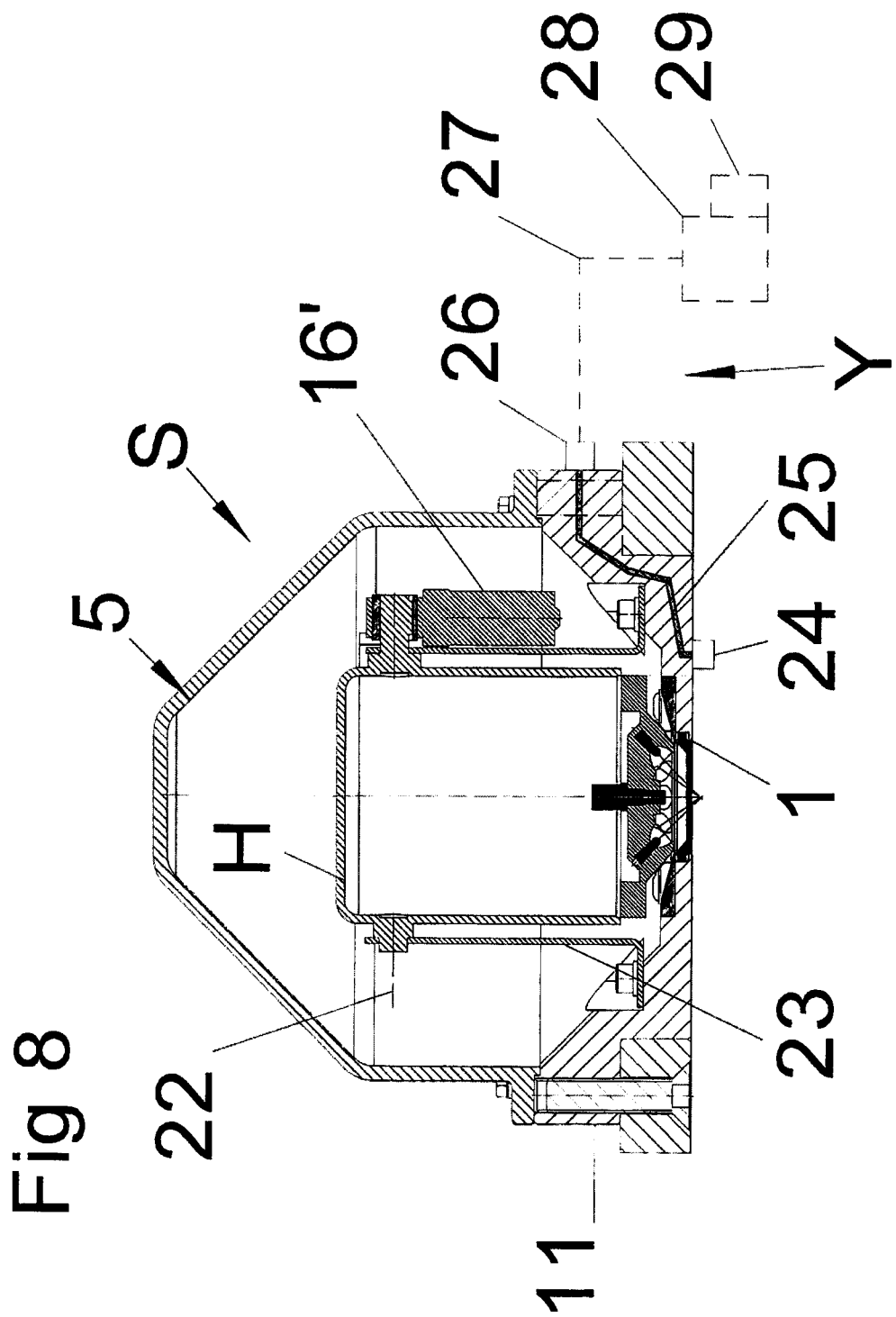

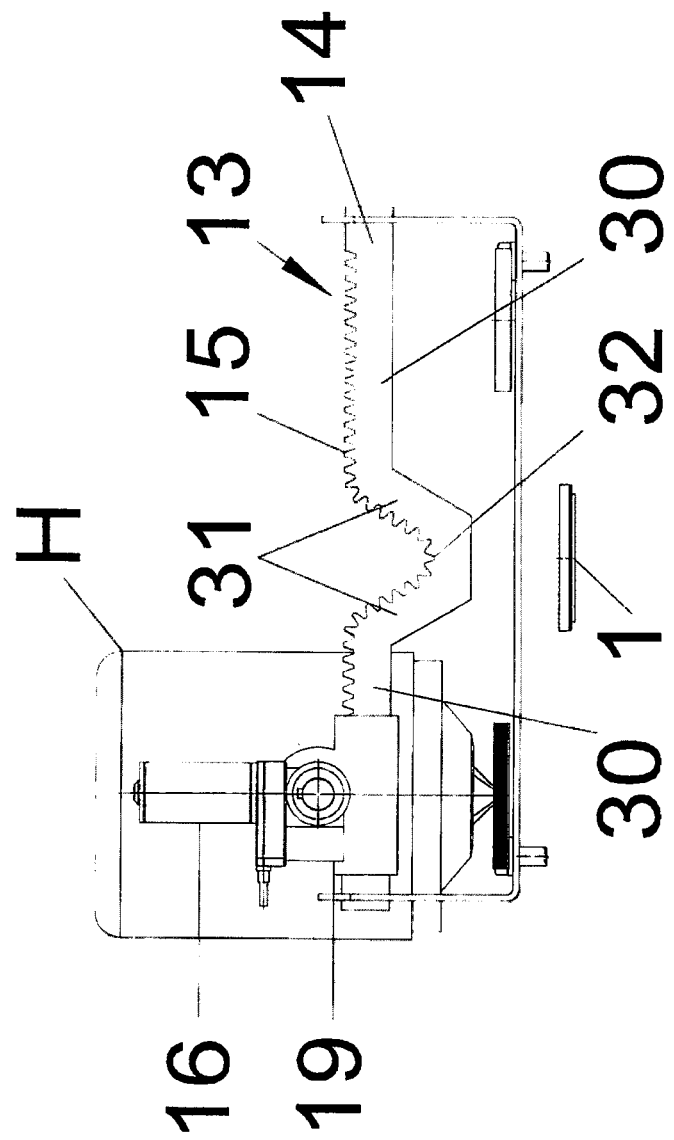

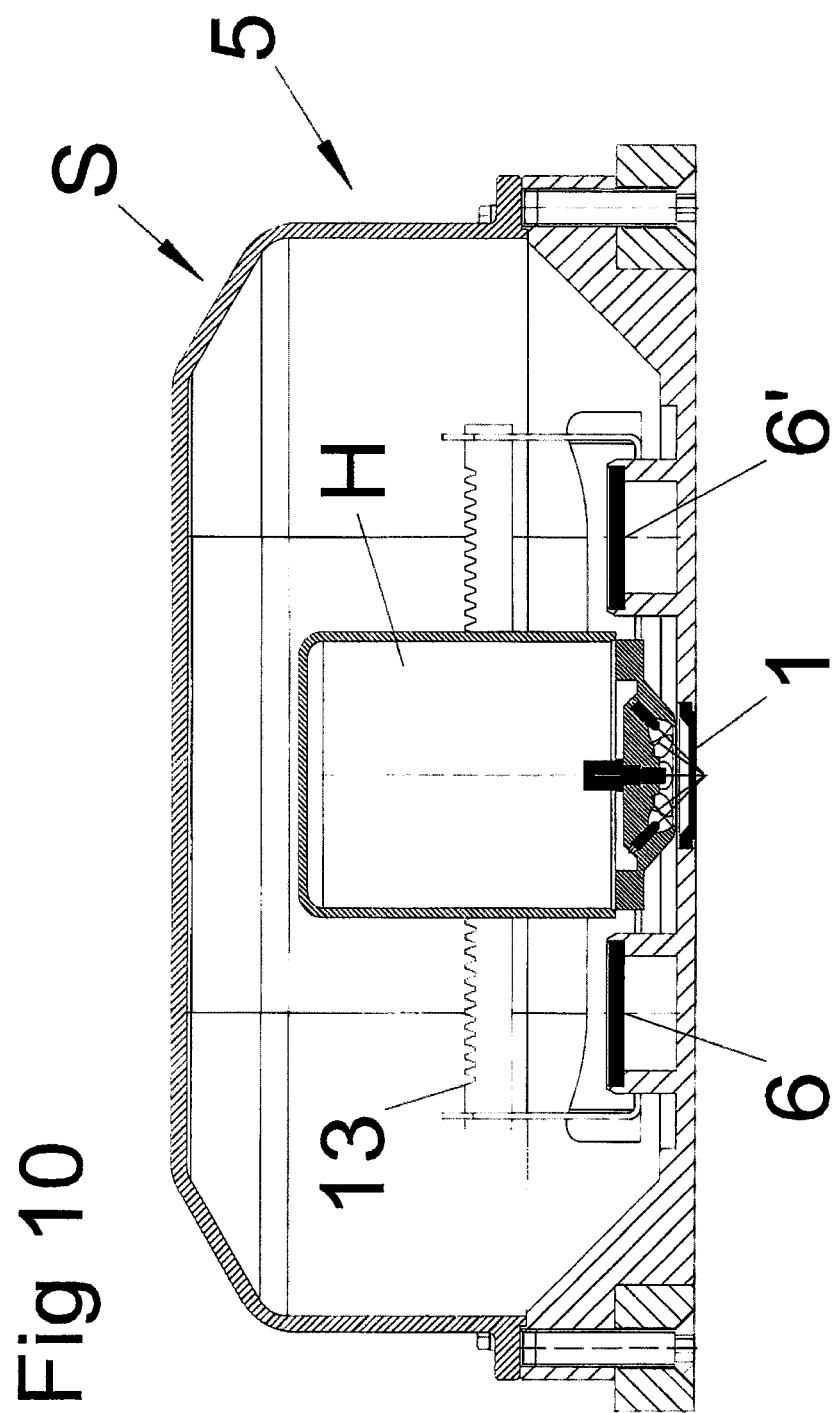

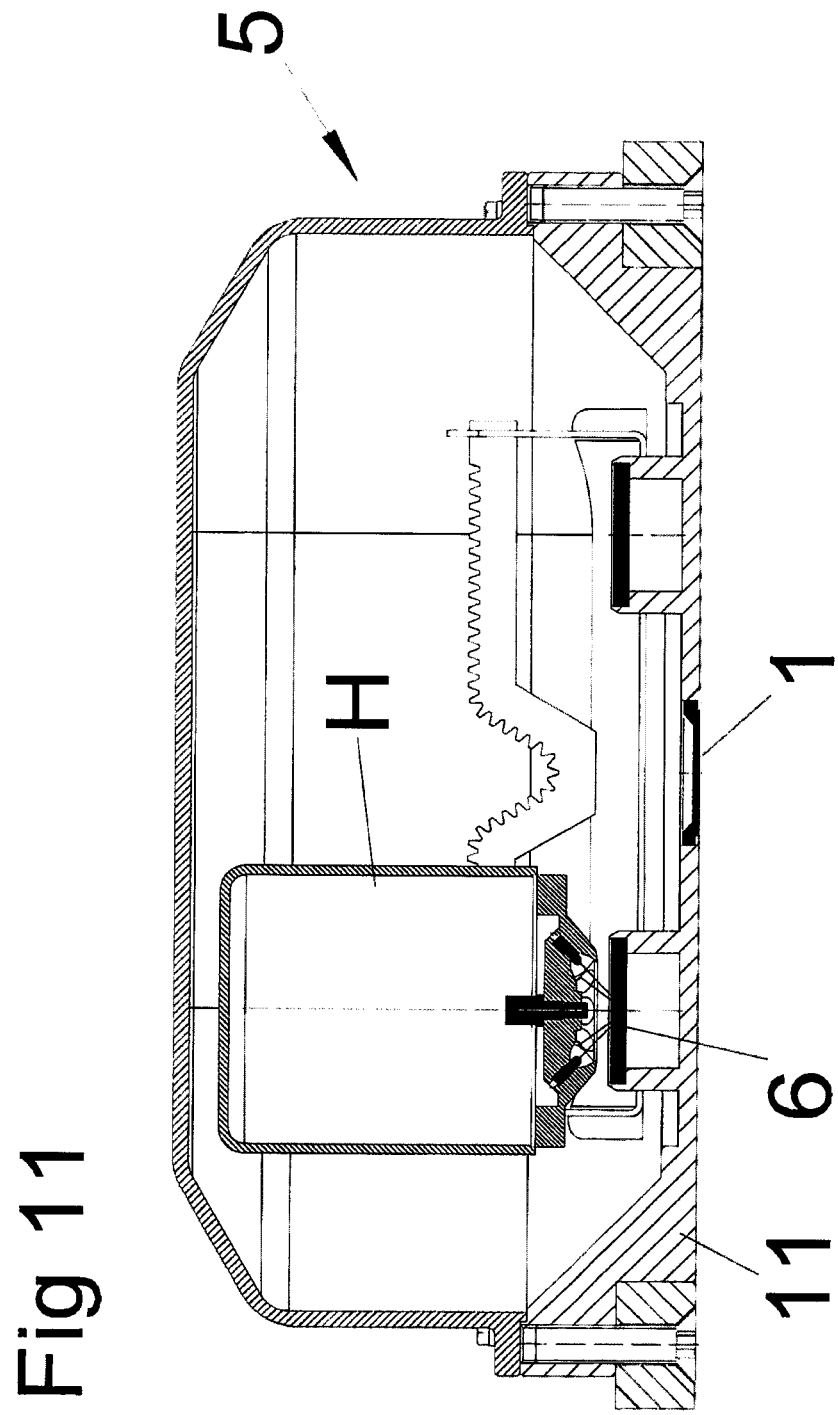

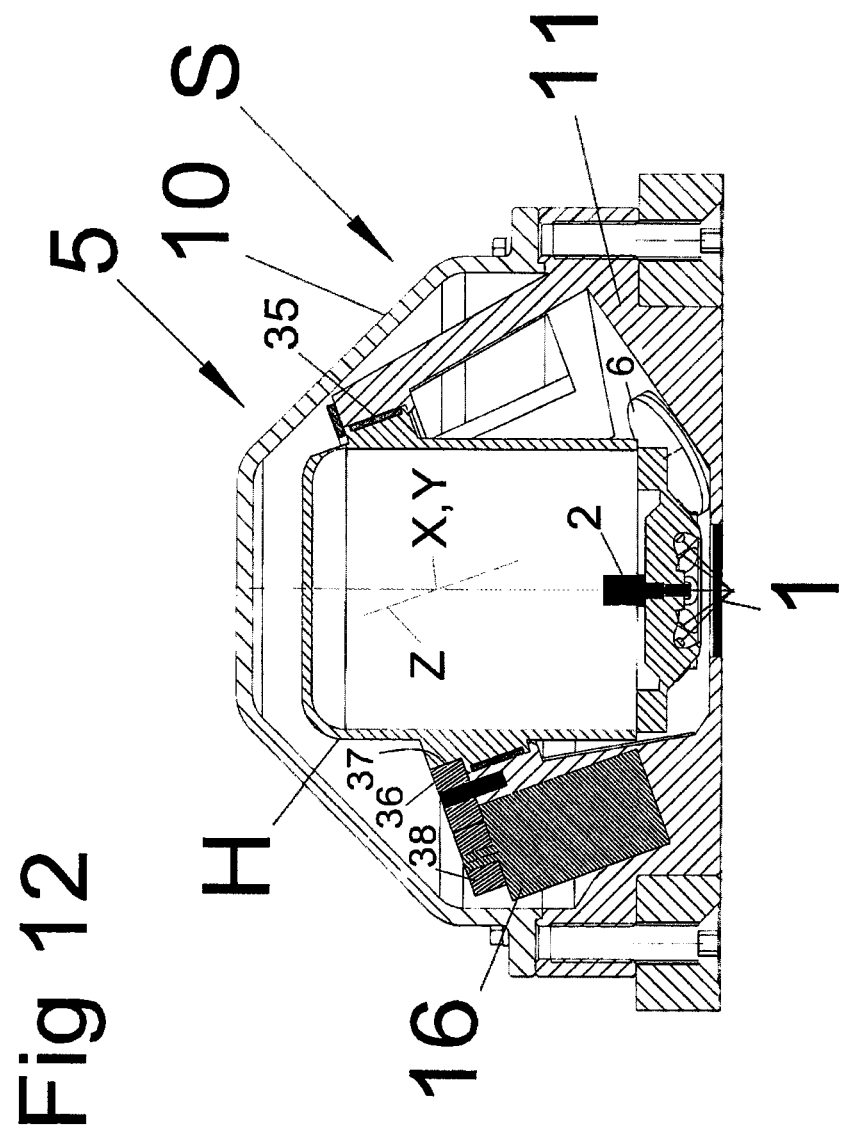

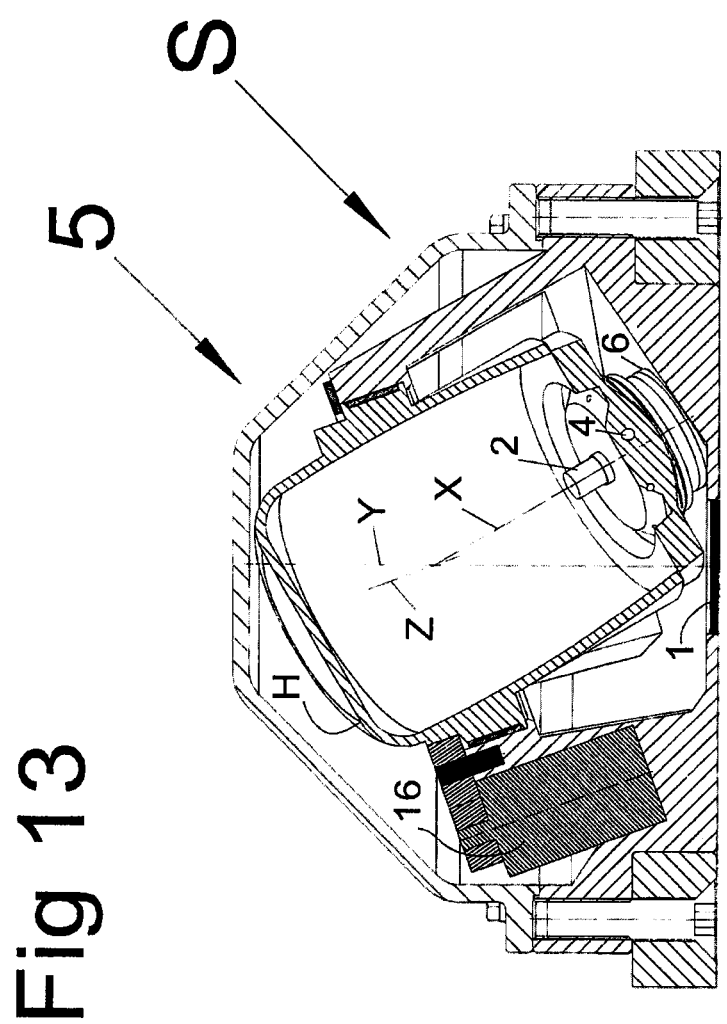

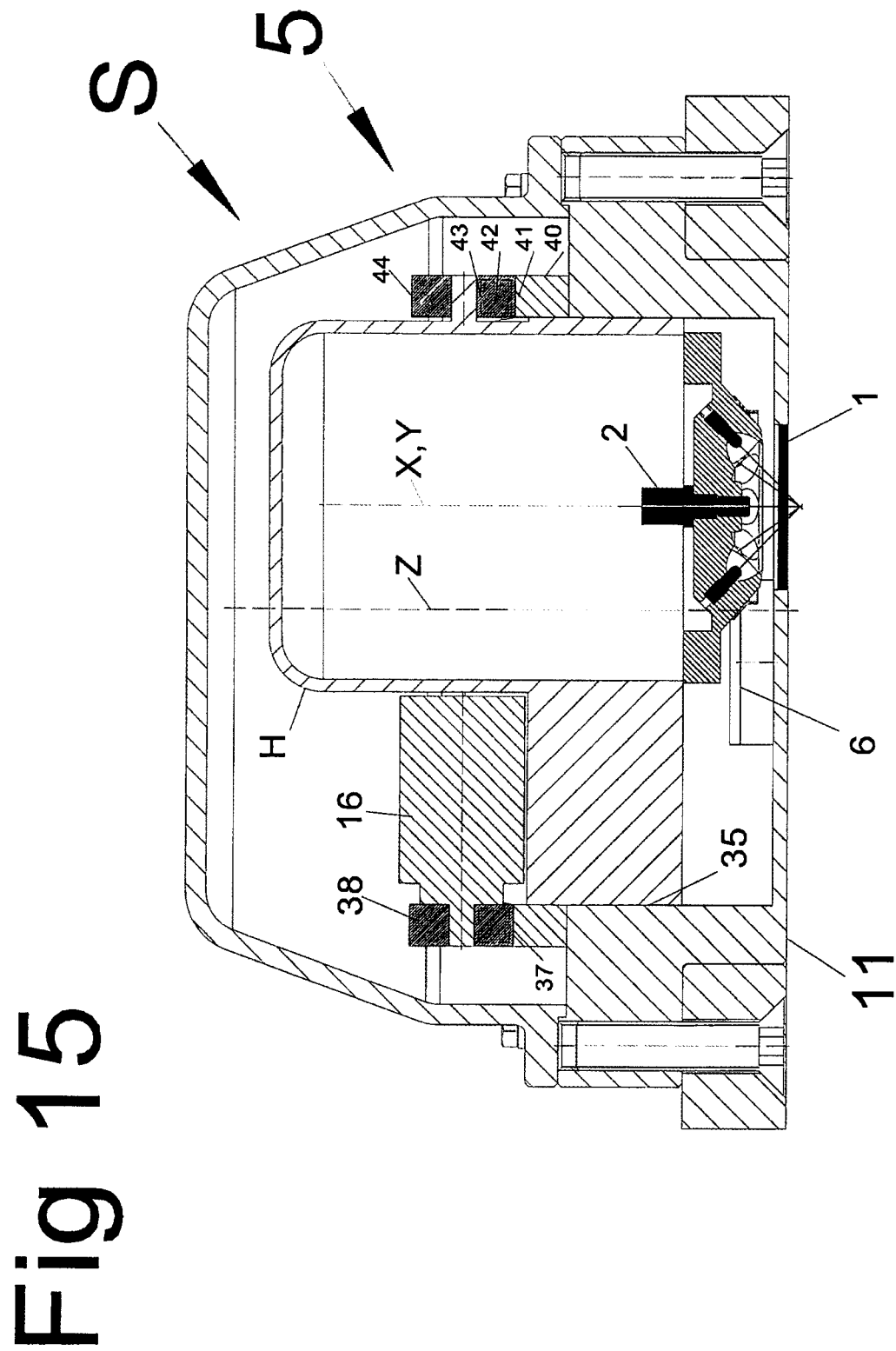

APPARATUS FOR PROCESSING CROP, ANIMAL FEED OR COMPONENTS, ELECTRONIC NIR SENSOR SYSTEM AND CALIBRATION METHOD

FIELD OF THE INVENTION

The invention refers generally to an apparatus to a feed mixer, and particularly to an electronic NIR sensor system, and to a calibration method.

BACKGROUND OF THE INVENTION

In a generic apparatus designed as a feed mixing wagon according to EP 3 332 635 A1, the NIR sensor system is installed at a measuring point on or in the tool. During the mixing process, the scanning head looks with the sensor through a transparent pane into the feed or feed components in order to determine spectroscopically proportional feed components and/or the degree of mixing, for example to control the mixing process. The sensor picks up reflected NIR light components, which are evaluated. Such components added to the roughage are for example cellulose, protein, dry matter, sugar, starch, ash and the like. Since the intensity or light quality of the NIR light source, e.g. several lamps, can change over time, it is necessary to calibrate the sensor system in order to achieve consistently informative measurement results. Up to now, a calibration surface with a known reflection value or spectrum has been used manually, for example. With the well-known feed mixing wagon, it is then necessary to climb into the mixing container, which is tedious and time-consuming.

Such electronic sensor systems can be used with all known forms of tools in such apparatuses, but also with other crop, feed and/or feed-component processing apparatuses, such as loading devices, loader wagons, shredders or similar applications where the sensor system has to be calibrated frequently.

In a method known from EP 1 740 928 B1 for calibrating a spectrometric measuring head for determining animal feed components, two calibration surfaces with different appearances are movably arranged in the housing of the NIR sensor system, which calibration surfaces are each adjustable into the beam path of the light source for calibration. The scanning head is stationarily installed with the sensor.

In a sensor system known from DE 10 2007 061 213 A1 for scanning a sample, calibration surfaces that can be placed in front of the scanning pane of the housing, e.g. with white and black coloring, are used for calibration. The spectrometric sensor is stationarily installed in the housing.

U.S. Pat. No. 4,970,695 A discloses a method for scanning a cement lining of a liquid-filled borehole using an ultrasonic sensor on a probe that rotates around the borehole axis. A calibration surface is placed in a scanning head supporting the sensor. By reversing the direction of rotation of the probe, the ultrasonic sensor is passively aligned only by inertial and frictional forces with the calibration surface, which has the same appearance as the cement lining in the surrounding liquid.

SUMMARY OF THE INVENTION

It is the object of the present invention to indicate an apparatus of the type mentioned above, an electronic sensor system and a method that not only enables reliable self-calibration without external intervention, but also enables precise process control of the apparatus in practice using modern data processing technologies.

This object is achieved with the features in the different embodiments.

In the apparatus, the NIR scanning head with the sensor inside the housing is actively and very precisely adjusted for calibration between the scanning position and the respective calibration position in which it is aligned with the calibration surface under the same optical and geometrical conditions as the pane in the scanning position.

It is useful when the respective calibration surface in the housing is arranged offset from the pane stationarily or essentially stationarily, so to speak floatingly.

In the electronic NIR sensor system, the scanning head with the light source is accommodated permanently protected in the housing, from where in the scanning position it scans through the transparent pane the crop, feed or feed components, i.e. a feed mixture, passing by the pane. For calibration, the scanning head is actively moved from the defined scanning position into the likewise defined calibration position to the at least one calibration surface, whereby it is arranged in the calibration position under the same optical and geometrical conditions relative to the calibration surface as in the scanning position relative to the pane. It is important that the appearance of the respective calibration surface is different from the varying appearance of the illuminated crop, feed or feed components on the pane in order to precisely determine a certain fixed reference value during calibration, e.g. electronically, and with the help of this to set the sensor system for precise and meaningful scanning of the feed and to precisely control a feed mixing process, e.g. with the measurement results and modern data processing.

In the method, the scanning head as a whole is actively moved back and forth between the positions and is precisely positioned in the housing each time. With the movement and relative positioning of the scanning head, reproducibly identical geometrical and optical scanning conditions can be better adjusted than with an adjustment of the calibration surface relative to the stationary scanning head or sensor.

In an expedient embodiment, at least two separate calibration surfaces differing from each other are provided, for example a white and a yellow one, each of which, however, is different from the appearance of the feed to be scanned behind the pane due to the selected coloring. For example, it is ensured, e.g. with a shielding, that possible interfering light from the pane does not influence the calibration, since the calibration is carried out in preparation for or after a mixing process even in the absence of crop, feed or feed components.

It is important that in the calibration position the distance and the alignment angle, e.g. exactly 90°, of the sensor from and to the calibration surface correspond at least substantially to the distance and alignment angle of the sensor from and to the outside of the pane in the scanning position. This ensures that the same optical conditions are given for the sensor during calibration as during scanning. Two calibration surfaces with different appearances improve the quality of the calibration because more than just one precisely predetermined light wave spectrum is available and can be used for further processing.

The scanning head in the housing is structurally simple and can be pivoted or moved circumferentially or wobblingly or eccentrically rotatably or linearly by means of a drive, preferably electric or electromechanical, and can be raised or lowered if necessary. These types of movement are easy to control and enable exact and reproducible positioning of the scanning head over a long service life. Movement patterns other than those mentioned are also possible. This also allows compact dimensions of the sensor system and its housing to be achieved. The drive can generate linear or rotary movements, which are converted into the predetermined movements of the scanning head.

The scanning head is advantageously pivoted back and forth around an axis fixed in the housing, e.g. at least approximately parallel to the pane, for example by means of an electric motor with or without gears. The different positions of the scanning head can be easily defined by mechanical stops in the housing and/or electronically via the motor. For example, the calibration position for the white calibration surface is a so-called parking position in which the scanning head remains before the start of operation, e.g. to start operation immediately with the scanning of this calibration surface.

Alternatively, the scanning head can be moved linearly and guided parallel to the pane along at least one guide rail. Two parallel guide rails are expediently installed in the housing to provide stable support for the scanning head. At least one guide rail may comprise a rack and pinion profile which the drive motor engages with a pinion, wherein the drive motor may be installed on the scanning head. The pane and the respective calibration surface are here arranged at least substantially at the same height in the housing.

This linear adjustment can be supplemented by the fact that the guide rails comprise not only linear sections parallel to the pane, but also inclined lifting and lowering sections with an intermediate lowest point (turning point), which for example mechanically defines the scanning position as a stop. In the raised position, the scanning head works together with a calibration surface, which is thus placed higher in the housing than the pane. This results in the advantage that the underside of the housing can be designed to be flat, without protrusions obstructing the passage of the feed, for the placement of the calibration surfaces, in which the pane, for example, is installed flush, countersunk or raised.

Alternatively, the scanning head can be rotated in a stationary rotary bearing in a wobbly manner, the axis of rotation of which is oblique to a vertical to the pane. The optical axis of the scanning head defined by the sensor is also inclined obliquely with respect to the axis of rotation of the rotary bearing in such a way that when the scanning head is rotated about the axis of rotation, the optical axis is perpendicular to the center of the pane only in the predetermined feed scanning position and is perpendicular to the calibration surface in each calibration position. The respective calibration surface is inclined relative to the pane and arranged higher, adapted to the wobbly movement, and is, preferably, substantially aligned with an intersection of the axis of rotation with the optical axis.

For all types of movement for the scanning head, it may be expedient to arrange the movement control in such a way that it is influenced as little as possible by centrifugal forces of a rotating tool carrying the sensor system. Furthermore, the scanning head can be secured in the respective position by a mechanical stop against uncontrolled displacement in the event of an emergency stop of the rotating tool.

Furthermore, the scanning head can be actively rotated in a rotary bearing parallel to a vertical to the pane and laterally offset from the pane, with an axis of rotation parallel to the vertical. Each calibration surface and also the pane have approximately the same radial distance from the rotary bearing, and the pane and the calibration surfaces can lie at the same height and parallel to each other.

Alternatively, it is also possible to actively rotate the scanning head in an eccentric rotary bearing relative to the center of the pane with an axis of rotation parallel to a vertical to the pane. Here, too, the pane and each calibration surface parallel thereto and lying at the same height are located at approximately the same radial distance from the axis of rotation of the rotary bearing.

In order to be able to arrange the respective calibration surface parallel to the pane but higher than the pane in order to obtain a flat housing bottom on the outside, it can be useful if the scanning head in the two aforementioned embodiments is guided in the rotary bearing so that it can be moved up and down. A scanning roller arranged on the scanning head runs, for example, on a stationary control cam in the housing and transmits lifting and lowering movements to the scanning head when it is moved about the axis of rotation of the rotary bearing. Starting from a recess defining the scanning position, e.g. mechanically, the control cam has at least one ascent to a plateau defining the calibration position for the scanning roller.

The respective calibration surface is expediently placed on the outside of a transparent pane which is at least largely identical to the scanning pane, especially in its optical properties, the preferably round shape, and the dimensions, in order to ensure substantially identical optical conditions during scanning and calibration. The calibration surfaces may alternatively be so-called tiles with any outline shape, e.g. with white or yellow, glossy or matt surfaces.

The housing with a round, polygonal or oval dome top and a largely flat bottom, which can be screwed to the dome top and e.g. the tool processing the feed, is installed at the desired measuring point. For accurate measurement and scanning results, it is useful if the sensor and the light source in the pane and the calibration surface only scan a round core area with a diameter of about 10 mm, for example, although the pane and the calibration surface are larger than this core area and have any shape.

In order to avoid that in the absence of feed, interfering light through the pane will influence calibration, it is expedient to have a partition wall inside the housing, for example a black rubber or plastic frame or a profile as an enclosure of the pane and/or the calibration surface and/or the scanning head. This partition wall is elastic so that it can be deformed during the relative movements of the scanning head and resets to provide reliable shielding.

It is also advantageous if the sensor system has an integrated heating device and/or cooling device to set or maintain an optimum sensor operating temperature.

Moreover, the pane may have a shape different from that of a circular cylinder, preferably with an offset and/or bevel, and may be fixed in a form-fitting manner. The pane is expediently accommodated in a frame mounted in the bottom of the housing to be detachable from the outside for plane replacement, preferably flush. To be on the safe side, the pane could consist of two parts: an outer pane contacted by the feed and an inner pane, also closing the housing, both of which are separately secured in position. The outer pane with its holder is subject to wear and may become detached and get into the feed in the event of poor maintenance. The inner pane prevents feed from entering the housing. Moreover, the sensor registers the loss of the outer pane via the abrupt optical change and can give a warning via a program routine not to feed this feed mixture anymore.

A preferred embodiment of the apparatus is that the respective sensor system or its housing is arranged on or in the drivable tool, which processes the crop, feed or feed components, to move therewith, for example in or on a mixing auger of a feed mixer. Power supply and/or signal transmission to and from the sensor system can be via sliding contacts, cables or wireless, e.g. inductive, e.g. via interacting coils. The sensor system could also be equipped with a battery and expediently with hardware equipment on at least one circuit board, with which the operation and/or a measured value evaluation can be carried out.

Since certain feed components, e.g. sugar, soil the outside of the pane over time and make perfect scanning difficult, it may be expedient to assign a remote-controllable spray device with a storage tank, a pump and at least one spray nozzle mounted at the bottom of the housing, to the sensor system. The pane can thus be cleaned before and/or after the mixing process as a precaution or in the case of critical soiling detected optically by the sensor system.

The self-calibrating sensor system can be used not only for the quantitative determination of feed components or the degree of mixing during the mixing process, but also for determining the degree of soiling of the pane using the at least one calibration surface. Then the spray device can be operated or a warning given. In order to eliminate a soiling of the pane, for example, water or a cleaning liquid could alternatively be added to a feed mixer as a precaution before the start of the mixing process. The friction of the feed on the outside of the pane then ensures cleaning.

The invention also includes a method for using the sensor system in the working or processing of crop, feed and feed components using modern data processing technologies, e.g. for quantitative determination of feed components and determination of the degree of mixing and for precise control of the mixing process.

According to the method the scanning head is moved in more than one calibration position to a first and at least one second calibration surface in order to increase the accuracy of the calibration and to be able to evaluate several measurement results differently.

The respective calibration surface is continuously scanned in the method between about 2 and 10 seconds in order to compensate fluctuations and to evaluate comparisons precisely.

The pane is scanned, clocked in the scanning position, e.g. 50 times per second, to better reflect variations in the appearances of the pane representing the degree of mixing during the mixing process. A pattern spectrum can be calculated from a predetermined number of last scans and further processed.

BRIEF DESCRIPTION OF THE DRAWINGS

Embodiments of the subject matter of the invention are explained with reference to the drawing, in which FIG. 3 shows a longitudinal section of the electronic sensor system in a scanning position, FIG. 4 shows a detailed view of FIG. 3, FIG. 5 shows a longitudinal section in a calibration position, FIG. 6 shows another embodiment in a scanning position, FIG. 7 shows an associated calibration position, FIG. 7a shows an enlarged section from FIG. 7, FIG. 8 shows a section rotated by 90° with respect to FIG. 6, FIG. 9 shows a detail of a further embodiment, FIG. 10 shows the associated scanning position, FIG. 11 shows the associated calibration position, FIG. 12 shows a further embodiment in the scanning position, FIG. 13 shows the corresponding calibration position, FIG. 15 shows a further embodiment in the scanning position.

DETAILED DESCRIPTION OF THE PREFERRED EMBODIMENTS

Figure 1:
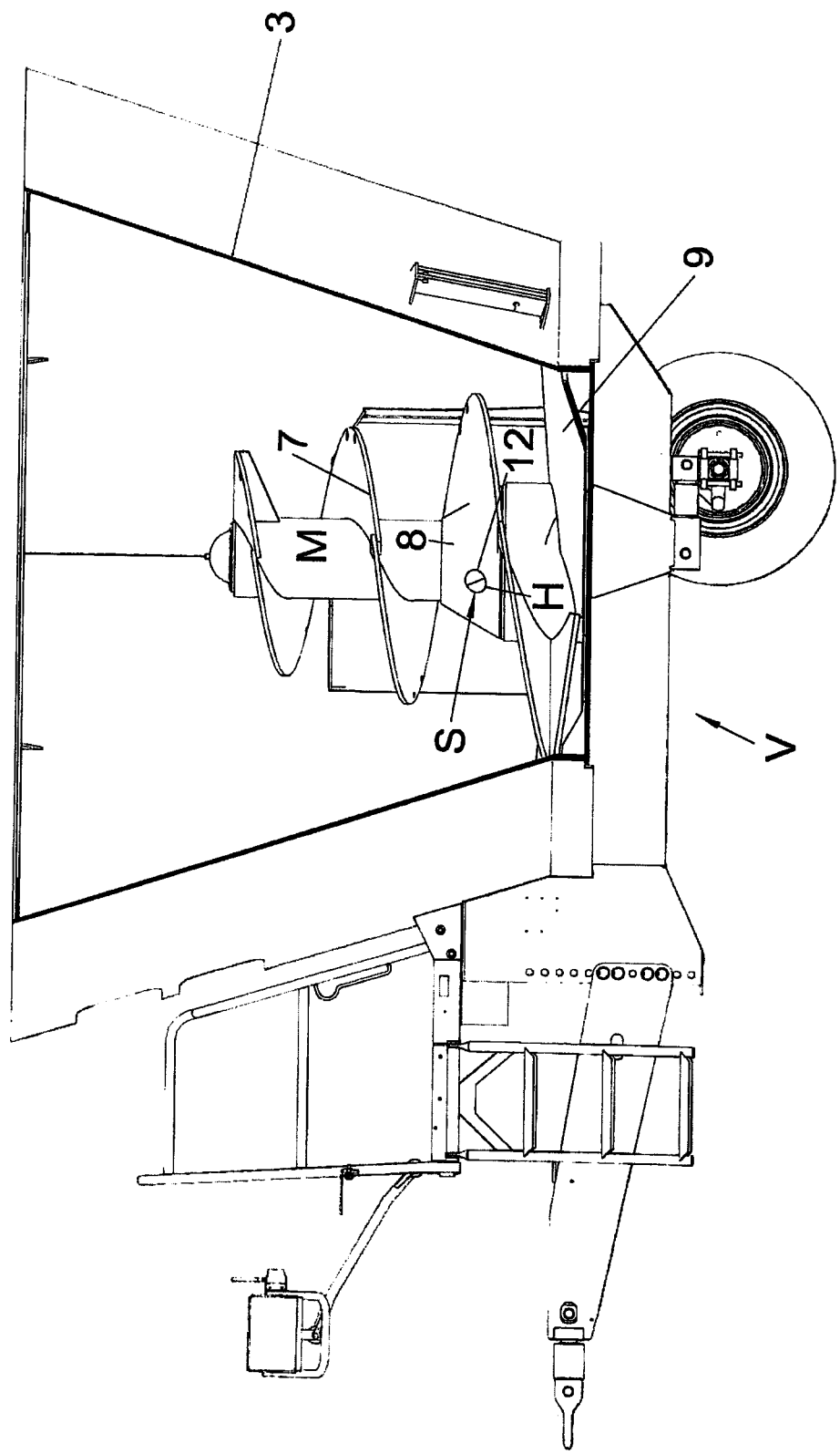
FIG. 1 shows a longitudinal section of a feed mixer as a non-restrictive example of an apparatus with an electronic sensor system here e.g. on a tool processing crop, feed or feed components.

FIG. 1 shows a non-restrictive example of an apparatus V for processing crop or animal feed or components, a mobile or stationary feed mixer in any form, e.g. a feed mixing wagon. Alternatively, the apparatus V could be a crop or feed loader or similar device, e.g. a loader wagon, shredder or the like, for working or processing crop or feed.

In FIG. 1 at least one drivable tool M, for example a vertical mixing auger, is provided in a mixing container 3, which mixing auger in this embodiment comprises an auger flight 7 on a core tube 8 and e.g. bottom-side agitator blades 9 or receiving strips 9. Alternatively, the tool M could be a horizontal auger, an agitator shaft, a mixing chain or the like.

An electronically operable NIR sensor system S with a scanning head H is installed at or in the tool M at at least one measuring point 12, the scanning head H being placed in a housing 5 behind a transparent pane 1 to be passed by the feed. The sensor system S can not only be used to be co-movable with a tool M, but also be stationary, e.g. on the mixing container wall, a dosing device, a guide cone of the feed mixer or the like. The sensor system S is an electronic NIR sensor system that uses NIR light and its reflection from the feed to determine at least feed components to be added and/or the degree of mixing by spectrometric means. Apart from cellulose, the components can for example be protein, dry matter, sugar, starch, ash and other ingredients.

Figure 2:
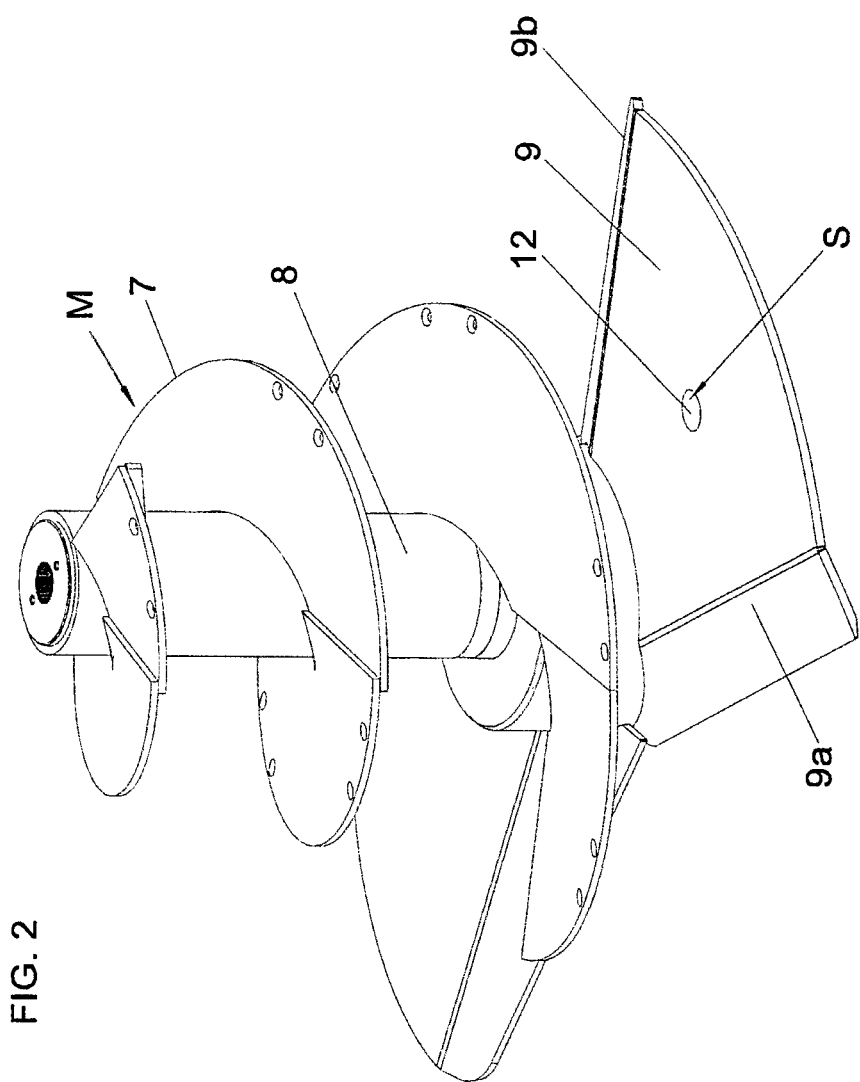
FIG. 2 shows the tool of FIG. 1, e.g. a vertical mixing auger of the feed mixer.

FIG. 2 shows on an enlarged scale the tool M of FIG. 1, whose optional agitator blade 9 here has front and rear descending parts 9a, 9b. At least one sensor system S is installed with the housing 5 in a cutout of an agitator blade 9 behind the pane 1.

Several sensor systems S can be installed on the tool M.

FIGS. 3 to 15 show different embodiments of NIR sensor systems that can also be used, for example, in the apparatus V of FIGS. 1 and 2.

The sensor system S in FIGS. 3 to 5 has a housing 5 with a dome-shaped, here e.g. oval upper part 10 and essentially flat bottom 11, which are screwed together and in a cutout, e.g. of the flight 7 or the agitator blade 9, and accommodate the scanning head H. The scanning head H is provided with at least one NIR light source 4 (preferably a plurality of light sources distributed in the circumferential direction) and a spectrometric sensor 2. The light source and the sensor 2 are aligned in a scanning position with the pane 1 arranged in the bottom 11 at the measuring point 12, e.g. with an alignment angle α of the sensor 2 of 90°, while the light sources concentrate laterally at oblique angles on a core region of the pane 1, so that only a round core region of about 10 mm diameter is scanned, although the pane 1 is larger.

The housing 5 contains a stationary motion drive 13 for the scanning head H, namely here two parallel guide rails 14, which run parallel to the pane 1 in a straight line and are supported on brackets 18 at the bottom 11. At least one guide rail carries an upper-side rack and pinion profile 15 for a gear drive 17 with an electric drive motor 16 on the scanning head H. The bracket 18 respectively forms a mechanical stop 19 for definition, here a calibration position, in which the scanning head H is aligned in FIG. 5 with a calibration surface 6' located at the same height and offset with respect to the pane 1. As an option, two calibration surfaces 6, 6' are installed offset to the pane 1 and stationary in the bottom 11. In the respective calibration position, the scanning head H is at an angle of 90° with a high distance x to the calibration surface 6, 6', just as in the scanning position relative to the pane 1, so that at least largely identical optical and geometrical conditions exist for the scanning head H for calibration and scanning.

In FIG. 5, each calibration surface 6, 6' is placed for example on the rear side on a transparent pane 20, which corresponds at least as closely as possible to the pane 1, in order to meet identical optical requirements. Alternatively, the calibration surfaces could be so-called tiles.

Each calibration surface 6, 6' has an appearance which is different from the appearance of the crop, feed or feed component behind the pane 1. For example, the calibration surfaces 6, 6' are provided with different colorings, e.g. white and yellow. In the calibration position, only a core area of about 10 mm is scanned at a time, although the surfaces 6, 6' are larger.

A calibration process is performed via an electronic actuation control (not shown), e.g. CPU in FIG. 7, of the sensor system S, by placing the scanning head H by the drive motor 16 (rotary motor or linear motor) in a calibration position in the housing 5 and scanning the predetermined and known NIR reflection behavior of the calibration surface 6, 6'. For example, if the light quality of the light source 4 changes, the deviation from known NIR reflection behaviors is used as a reason to readjust the light intensity, for example. The quality of the calibration is improved by two calibration surfaces 6, 6' with different appearances. The calibration surfaces 6, 6' also improve the possibilities for the further processing of scanning results when processing crop, feed or feed components, e.g. to produce a desired feed mixture, as will be explained later.

By contrast, the housing 5 of the embodiment of FIGS. 6, 7, 7a and 8 has a dome-shaped round upper part 10 and the bottom 11, the underside of which is continuously flat (or curved without protrusions). The outside of the pane 1 can be flush with the underside of the bottom 11 or countersunk or raised, even beveled if necessary. The calibration surfaces 6, 6' are placed offset from the pane 1 in the bottom higher than the pane 1 and stationary in an inclined position, namely aligned with an axis 22 parallel to the pane 1, which is supported on the bottom 11 by brackets 23 and around which the scanning head H can be actively pivoted by means of the drive motor 16' between the scanning position shown in FIG. 8 and a respective calibration position shown in FIG. 7. Each calibration surface 6, 6' may be covered by a transparent pane 20, which is approximately equal to the pane 1. If necessary, partition walls 21 (FIG. 6), for example in the form of black rubber or plastic frames of the calibration surfaces 6, 6' and/or the pane 1 and/or the scanning head H, are installed, which during calibration in the respective calibration position avoid any influence by scattered light or interfering light by the pane 1, and which are e.g. elastically deformable when pivoting the scanning head H and reset themselves automatically.

The scanning and calibration positions show the same geometrical conditions, i.e. the alignment angle α and the distance x of the axis 22 are identical.

The pane 1 is not necessarily circular and of uniform thickness in all embodiments, but e.g. non-circular or polygonal, it can be recessed or beveled, and, in FIGS. 7, 7a, sits fixed in a form-fitting manner in a frame 33 made of wear-resistant material, which for the replacement of the pane 1 is fixed with screws to be detachable from the outside in a cutout of the bottom 11 of the housing 5. The pane 1 could consist of an inner and an outer pane, which are fixed separately, so that if the outer pane with its frame 33 is lost, the housing 5 remains securely closed by the inner pane.

At least the two calibration positions in FIGS. 6 to 8 can be defined mechanically by stops not shown, or electrically via the drive motor 16'. The calibration position of the scanning head H, for example aligned with the white calibration surface 6, can be a predetermined parking position of the sensor system S in which it remains until the tool W or the apparatus V is put into operation.

FIG. 8 indicates an option for this embodiment and also for the other embodiments, namely a spray device B, in order to be able to clean the pane 1 on its outside as required, e.g. if it should be stuck or smeared, e.g. by sugar, and the proper scanning of the feed or feed components is impaired. The soiling degree of the pane 1 can be determined e.g. by an electronic comparison of the appearances (of the light spectra) of the soiled pane 1 and at least one calibration surface 6, 6'. This is done for example before, at the beginning, before the end or after a mixing process or at regular intervals. The result can be a warning, or the request or execution of a cleaning of the pane 1. E.g. the sensor head H is put into the scanning position before feed or as soon as some feed or only a small amount of feed is available. As soon as the sensor 2 detects light, the spray device R is activated. If the pressure of the cleaning is sufficient, the pane 1 is actively cleaned. Otherwise, the feed with the liquid cleans the pane 1 by friction.

The embodiment of FIGS. 9 to 11 is similar to that of FIGS. 3 to 5. The housing 5 has the oval dome-shaped upper part 10 and the bottom 11 which is here flat on its underside. The two calibration surfaces 6, 6' installed in the bottom 11 are parallel to the pane 1, but for the purpose of the flat bottom underside 11 they are placed higher than the pane 1, which, for example, is approximately flush with the bottom underside with its outside. The motion drive 13 comprises two parallel guide rails 14. Each guide rail 14 has straight sections 30 running parallel to the pane 1 and here central lowering and lifting sections 31 defining a lowest point 32 (turning point, mechanical stop for the scanning position). By contrast, in the calibration position on the calibration surface 6 shown in FIG. 11 and e.g. defined by a mechanical stop 19, the scanning head H is located on the higher straight section 30 of the guide rails 14.

The spray device P indicated as an option in FIG. 8 comprises at least one spray nozzle 24 here on the underside of the bottom 11, the spraying direction of which is oriented towards the outside of the pane 1, as well as e.g. a channel 25 in the bottom 11 to an external connection 26, a connection line 27 to a storage tank 28 for a cleaning medium, as well as a pump 29 which is connected to the storage tank 28 and is e.g. activatable via the control CPU.

A further option for all embodiments is a heating device and/or cooling device T, e.g. indicated in FIG. 4, which is assigned to the sensor system S e.g. in the housing 5, for setting and/or maintaining an optimum operating temperature of the sensor 2 and its electronics. The apparatus V can stand outside under unfavorable weather conditions, so that the pane 1 is covered with ice, snow, condensation water or residual feed. The then typical spectra detected by the sensor 2 are stored to determine whether it is a normal, non-interfering soiling or whether cleaning is necessary.

The sensor 2 should have a temperature of at least about 4° C., for example, to function properly. When the scanning position is set, the longer-activated light source 4 can generate heat to remove condensation water and ice from the pane 1. Alternatively, or additionally, at low or high temperatures the heating device or the cooling device T (e.g. a fan or a passive thermoelectric element, such as a Peltier element, the colder part of which may be located for example at the bottom in the housing 5 and the warmer part of which may be placed outside the housing 5) can be switched on. The housing 5 also has a venting system due to unavoidable temperature differences.

The motion drives 13 of the scanning head H in the embodiments shown are expediently arranged so that they are exposed as little as possible to centrifugal forces of the rotating tool M carrying the sensor system S around its axis of rotation. The respective mechanical stop should reliably support the scanning head against uncontrolled displacement in the event of an emergency stop of a rotating tool carrying the sensor system.

In the embodiment of FIGS. 12 and 13, the scanning head H in the housing 5 is wobblingly movable between the scanning position and the respective calibration position by the drive motor 16. This means that the scanning head H with the optical axis x defined by the sensor 2 is arranged obliquely in a part of the housing 5 of the scanning head H in a rotary bearing 35, whose axis of rotation Z is inclined obliquely with respect to a vertical to the pane 1, for example at an angle of about 30°. The drive motor 16 installed here on the rotary bearing 35 drives an intermediate gear 36 via a pinion 38, which gear meshes with a toothing 37 of the housing part of the scanning head H in order to rotate the scanning head H about the axis of rotation Z, namely between the scanning position shown in FIG. 12, in which the optical axis X coincides with a vertical Y (to the pane 1), and a calibration position according to FIG. 13, in which the scanning head H is aligned, for example, with the calibration surface 6, which is inclined obliquely in the housing 5 and aligned, for example, with the intersection between the axis of rotation Z, the vertical Y and the optical axis X. The calibration position in the case of white is for example also the parking position of the sensor system S before the start of operation. If a second calibration surface 6' is provided, it is arranged at an angle similar to the calibration surface 6 in the housing 5 so that it is aligned with the aforementioned intersection. For example, the two calibration positions and the scanning position can each be offset by 120° relative to each other, and are located at the same radial distances from the center of, for example, the here circular bottom 11 of the housing 5.

Figure 14:
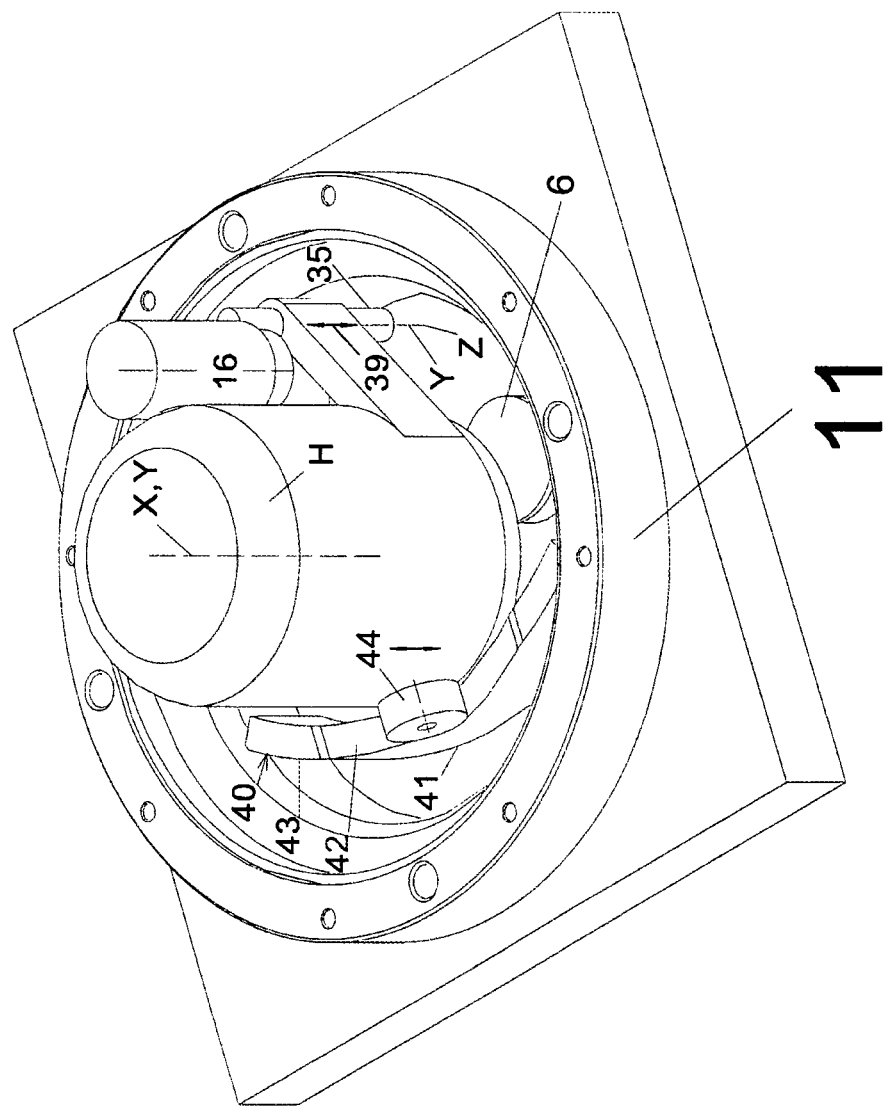
FIG. 14 is a perspective view of a further embodiment in the scanning position.

In the embodiment of FIG. 14 the rotary bearing 35 with the axis of rotation Z, has, for example, a vertical bolt on one side of the bottom 11, which is here round. The scanning head H is in the scanning position in FIG. 14, whereby the optical axis X and the vertical Y to the center of the pane 1 coincide. It can be pivoted by the drive motor 16 with a boom in the rotary bearing 35, whereby (not shown) the pane 1 and the calibration surfaces 6, 6' can be installed in the bottom 11 at the same height. In addition, however, the embodiment in FIG. 14 has a control cam 40 installed on the bottom 11 for a scanning roller 44 arranged on the scanning head H, with a central recess 41 (for defining the scanning position), and ascents 42 starting therefrom to higher-lying plateaus 43. An upward and downward movement (double arrow 39) is generated via the scanning roller 44 and the control cam 40, depending on the pivoting of the scanning head H about the axis of rotation Z of the rotary bearing 35, namely for the embodiment shown, in which the calibration surfaces 6, 6' are arranged higher than the pane 1 (in order to enable a flat bottom underside).

The embodiment of FIG. 15 has in the bottom 11 a rotary bearing 35 eccentric to the pane 1 for the scanning head H, which is also arranged eccentrically and actively rotatable in the rotary bearing 35. The axis of rotation Z of the rotary bearing 35 is parallel to the vertical Y to the center of the pane 1 and laterally offset from it. The electric drive motor installed on the scanning head H acts with a pinion 38 on a toothing 37 on the bottom 11, which surrounds the rotary bearing 35 circumferentially, in order to actively adjust the scanning head H between the scanning position shown in FIG. 15 (optical axis X and vertical Y coincide) and the respective calibration position. If the calibration surfaces 6, 6' are arranged at the same height as the pane 1, the toothing 37 can be parallel to the pane 1. However, in the embodiment in FIG. 15, similar to FIG. 14, due to the calibration surfaces 6, 6' arranged higher than the pane 1, the control cam 40 is provided with the recess 41, the ascents 42 and the plateaus 43 for the scanning roller 44 on the scanning head H in order to enable a flat bottom underside. The scanning and calibration positions can for example be defined mechanically in the embodiment of FIG. 15, as well as in FIG. 14, by stops on the control cam and the recess 41.

The invention also includes a method for using the electronic sensor system S in feed processing, e.g. for quantitative detection and determination of feed components and for monitoring the degree of mixing until the mixing process is terminated. The following is a non-restrictive example of this method.

Before the feed mixer of FIGS. 1 and 2 is put into operation and when the mixing container is empty, the scanning head H is in the parking position (FIG. 8) aligned with the white calibration surface 6. Before the start of mixing, the sensor 2 carries out a reference measurement on the white calibration surface 6. The measurement result is recorded. Then the scanning head H is pivoted into the second calibration position according to FIG. 7, aligned with the yellow calibration surface 6'. The measurement result is recorded. The scanning head H is then pivoted into the scanning position aligned with the pane 1 and it is determined whether the pane 1 is clean or dirty. The measurement result is evaluated and taken into account as explained above.

If the measurement result is a clean pane 1, then it is determined that the calibration was OK and the loading of the mixing container is allowed to begin. If the pane is too dirty, a message is derived that a cleaning of the pane 1 is necessary first. Then, for example, the spray device P is activated or the pane is cleaned with a hose in the mixing container. The measurement on the yellow calibration surface 6' is normally only required once per working cycle, e.g. to check the correct, non-shifted position of the longitudinal axis of the light wave.

For calibration, the white calibration surface 6 is first scanned for approximately 2 seconds and the actual state is checked, e.g. using a mirror provided on a circuit board. If the measurement result is positive, the white calibration surface 6 is scanned for approximately 10 seconds, as the light intensity or an electrical voltage determined from the reflected light may fluctuate slightly. From this measurement a current reference value is determined by calculation and recorded. In the mixing process, a measured spectrum with the corrections from the calibration is compared with stored calibration lines, which are preferably stored in the same storage medium.

The loading process initially includes e.g. roughage, e.g. grass, corn, hay or straw. The tool M is set in motion. The roughage is mixed. During the mixing process, the sensor 2 scans for instance 50 times per second, clocked in the scanning position. From this, a spectrum is derived per scanning process. The collected spectra are evaluated and compared. As soon as the evaluated spectra no longer change above a selectable limit value of 98%, for example, this is an indication of a desired mixing accuracy (mixing degree), which is registered as correct. The last determined spectrum, or e.g. an average value of the last five spectra, is stored and recorded as an analysis spectrum. Then, for example, a reference measurement can be performed again on the white calibration surface 6 for safety reasons. The result of the first reference measurement on the white calibration surface 6, the determined analysis spectrum and the second reference measurement on the white calibration surface 6 are sent as a file to an intelligent communication module via Bluetooth, for example. The reference measurement on the yellow calibration surface 6' is also recorded there. Then an analysis is carried out by comparison with calibration data (calibration characteristics). The analysis can be carried out within the sensor system S. The measurement results are then compared with a predetermined calculated feed value before the mixing process is continued with a view to achieving feed values predetermined by a user for the processed ration. This can be done, for example, using feed optimization software in a programmable scale of the feed mixer in FIG. 1. In order to carry out this process economically and as precisely as possible, as much cost-effective roughage as possible is first processed and quantities of relatively expensive additives such as concentrated feed, soy meal etc. are only then added on the basis of one or more self-selected or predetermined output parameters. Then, as calculated or suggested by the program, a last small amount of feed component is loaded and mixed in before another reference measurement is carried out again on the white calibration surface 6 (the program routine of checking the dirty pane 1 is skipped, as this is no longer possible). Then, at the desired mixing accuracy, as recorded, an analysis of the spectrum is carried out again, followed by another calibration on the white calibration surface 6, before the overall result is recorded as an analysis. The analysis represents an actual feed value. Analyses can be performed either in the sensor system S, which requires a powerful CPU, with calibration characteristics being stored in the sensor system S. Communication with the communication module includes, for example, information on mixing accuracy, the result of the analyses, commands, alarms and warnings, and updates to calibration curves and firmware. However, analyses can also be carried out in the communication module or, for example, in an ECU in the mixing wagon V of FIG. 1 or in its weighing computer. In this case, calibration characteristics are stored there and the spectra are communicated, e.g. via Bluetooth. It is also possible to carry out analyses in the cloud, where calibration characteristics are also stored, whereby communication then takes place via Wifi or WLAN.

Using the example of a mixing process in the feed mixer of FIG. 1, the processing of measurement results in connection with the calibration of the sensor system S and a communication with peripheral electronic devices as well as instructions to an operator or an automatic process control are explained below. For this purpose, a start-up procedure is carried out in the sensor system S before the start of the mixing process, for example checking the validity of the sensor system once a day, and a measurement cycle is carried out during which a background scan, a pane soiling check, a monitoring of the mixing process with determination of the degree of mixing and a temporal end point of the mixing process, a checking calibration measurement, and a calculation of a final spectrum for predicting the composition of the feed mixture, possibly with instructions on specific quantities of feed ingredients to be added, are carried out before the sensor system S is reset to a parking position and switched off.

In the start-up procedure, the system is first initialized before the electronics are checked. Before a ready status signal is then derived, the calibration position of the sensor head is checked or adjusted, e.g. aligned with the white calibration surface 6. In the scanning position aligned with the white calibration surface 6, the sensor validity is determined by first carrying out a correction scanning for approximately 2 seconds using an existing mirror. This represents a stability check, on which a recorded background scan of approximately 10 seconds is performed if the result is positive. Calculation files and update files are recorded and a background performance spectrum is calculated. The sensor head is then placed in the scanning position on the yellow calibration surface 6' and a standard sample scan is recorded for 10 seconds, for example, to calculate the yellow power spectrum, to calculate a yellow absorption spectrum, to run a library function and to run the validity checks.

Subsequently, the sensor head can be brought at least once into the scanning position aligned with the pane in order to check soiling, to emit a warning signal when soiling is detected or to initiate a cleaning, or to generate a ready signal when the pane is clean, before the sensor head is subsequently set back into the scanning position aligned with the white calibration surface 6.

To monitor the mixing process and to determine the degree of mixing and thus the final point in time of the mixing process, the sensor head H is put into the scanning position aligned with the pane 1. Then a continuous pattern scan is performed over 2 seconds, for example. The pane 1 can be scanned 50 times per minute or per second, for example. An average pattern spectrum is calculated from, for example, five last scans after reaching a mixing accuracy threshold of e.g. 98%, and the absorption spectrum is calculated using the calculated background performance spectrum and a new scan of the white calibration surface 6. The mixture status is determined by evaluating the measurement results and sent to a user interface. This is repeated until the predetermined threshold is reached at which the mixing status no longer changes significantly (attainment of the desired mixing accuracy). Scanning is then stopped.

As mentioned, the sensor head H is returned into the scanning position aligned with the white scanning surface 6, and a continuous scan is performed for 10 second scans, from which a pattern spectrum is calculated using the average of the last five pattern scans and the scan of the white calibration surface to finally calculate the absorption spectrum. Then an analysis is performed by comparing the absorption spectrum with predetermined prediction equations.

To calculate the final spectrum and predict the composition of the feed mixture, it is calculated using the calculated absorption spectrum and predetermined prediction equations. The results are percentages or quantities of, for example, dry fractions, proteins, fibers or cellulose, fat, ash, sugar or starch. These results are transferred to the user interface, for example for the operator or the automatic process control. In this way, the operator or the automatic process control is informed whether or not feed components are still to be reloaded and in what quantities, that and how the predetermined composition of the feed mixture is achieved, and when the mixing process can be stopped because the desired mixing accuracy has been achieved. This can be done in one cycle or, if corrections are required, in several of these cycles.

The mixing accuracy can be continuously monitored. In order to make better use of the limited lifetime (e.g. 10,000 hours) of the light sources, the mixing process could be monitored at the beginning with intermediate intervals that become shorter and shorter as the set mixing accuracy threshold approaches.

What is claimed is:

1. Apparatus for processing crop, animal feed or components, comprising:
a drivable tool and at least one NIR sensor system for determining feed values and/or a mixing accuracy, which comprises an NIR scanning head with at least one spectrometric sensor and at least one light source behind a transparent pane which can be passed by the feed, wherein the scanning head is actively adjustable for calibration in a housing of the NIR sensor system containing the pane, between a scanning position aligned with the pane and at least one calibration position aligned with a calibration surface, the appearance of which is different from the appearance of the crop or feed on the pane.

2. Apparatus according to claim 1, wherein:
two separated calibration surfaces with mutually different appearances are provided stationary in the housing.

3. Apparatus according to claim 2, wherein:
the mutually different appearances of said two separate calibration surfaces are white and yellow coloring.

4. Apparatus according to claim 1, wherein:
in each calibration position the distance and the alignment angle of the sensor and the light source from and to the calibration surface correspond to the distance and the alignment angle from and to the pane in the scanning position.

5. Apparatus according to claim 1, wherein:
the scanning head in the housing is pivotable, circumferentially rotatable, wobblingly rotatable, linearly displaceable and, where appropriate, liftable and/or lowerable between predetermined scanning and calibration positions, including a parking position, by a drive arranged in the housing.

6. Apparatus according to claim 1, wherein:
the scanning head can be pivoted back and forth about an axis which is fixed in the housing and substantially parallel to the pane.

7. Apparatus according to claim 1, wherein:
the scanning, parking and calibration positions of the scanning head are defined by mechanical stops or electrically.

8. Apparatus according to claim 1, wherein:
the scanning head is displaceable linearly and guided substantially parallel to the pane along at least one guide rail.

9. Apparatus according to claim 8, wherein:
the at least one guide rail comprises a rack and pinion profile for a gear drive installed on the scanning head.

10. Apparatus according to claim 1, wherein:
the scanning head is displaceable guided along at least one guide rail, which comprises linear sections parallel to the pane and lifting and lowering sections as well as a rack and pinion profile for a gear drive installed on the scanning head.

11. Apparatus according to claim 1, wherein:
the scanning head is actively wobblingly rotatable in a stationary rotary bearing, the axis of rotation of which extends obliquely with respect to a vertical to the pane, that the optical axis of the scanning head defined by the sensor is obliquely inclined with respect to the axis of rotation of the rotary bearing, such that upon rotation of the scanning head about the axis of rotation, the optical axis of the scanning head stands perpendicular to the center of the pane in a predetermined scanning position, and that the calibration surfaces are inclined relative to the pane.

12. Apparatus according to claim 11, wherein:
the calibration surfaces are substantially aligned with an intersection of the axis of rotation with the optical axis.

13. Apparatus according to claim 1, wherein:
the scanning head is actively rotatable in an axis of rotation, which is parallel to a vertical to the center of the pane, of a rotary bearing which is laterally offset with respect to the pane, and that each calibration surface and the pane are placed approximately at the same radial distance from the rotary bearing.

14. Apparatus according to claim 13, wherein:
the scanning head is guided in the rotary bearing so as to be displaceable up and down in the direction of the vertical, that a stationary control cam is provided for a scanning roller of the scanning head, that the control cam, starting from a recess defining the scanning position, has at least one ascent to a plateau defining the calibration position, and that each calibration surface is placed parallel to the pane at a higher level than the latter.

15. Apparatus according to claim 1, wherein:
the scanning head is actively rotatable in a rotary bearing eccentric with respect to the center of the pane with an axis of rotation parallel to a vertical to the center of the pane and is placed in the rotary bearing eccentrically with respect to the axis of rotation, and that the pane and each calibration surface parallel thereto are arranged approximately at the same radial distance from the axis of rotation.

16. Apparatus according to claim 1, wherein:
the calibration surface is placed on the outside of a transparent pane which is at least substantially identical to the pane, the shape and the dimensions.

17. Apparatus according to claim 1, wherein:
the housing is formed with a basically round, quadrangular or oval dome top and a bottom which is at least substantially flat on the underside, that the pane is seated in a frame mounted in the bottom so as to be detachable from the outside for pane replacement, and that the pane has a shape which deviates from a circular cylinder, and is fixed in a form-fitting manner.

18. Apparatus according to claim 1, wherein:
the pane is formed of outer and inner panes which are separately fixed in the bottom.

19. Apparatus according to claim 1, further comprising:
a partition wall is provided between the pane and the calibration surface.

20. Apparatus according to claim 1, wherein:
the housing of the sensor system is co-movably arranged on or in the drivable tool, which is processing crop, feed or feed components.

21. Apparatus according to claim 20, wherein:
the housing of the sensor system is on a mixing auger of a feed mixer.

22. Apparatus according to claim 1, wherein:
the sensor system comprises a heating device and/or a cooling device.

23. Apparatus according to claim 1, further comprising:
a spray device connected to the housing and comprising a storage container, a pump and at least one spray nozzle mounted on the bottom is provided for the outside of the pane.

24. Apparatus according to claim 1, further comprising:
an electronic control of the sensor system is additionally designed using the calibration surface for determining a soiling degree of the outside of the pane and/or for activating a spray device.

25. Electronic NIR sensor system for determining feed values and/or a degree of mixing in apparatuses processing crop, animal feed or components, comprising:
a housing containing an NIR sensor, at least one light source in a scanning head and a transparent pane, wherein the scanning head in the housing is aligned with the pane in a feed scanning position, that at least one calibration surface is provided in the housing for calibrating the sensor system, offset with respect to the pane, and that the scanning head for calibrating the sensor system is actively adjustable between the scanning position and a calibration position aligned with a respective calibration surface, wherein the appearance of each calibration surface is different from the appearance of the crop or feed on the pane.

26. Method for calibrating an NIR sensor system used to determine feed values and/or a degree of mixing in a feed mixture, which NIR sensor system comprises:
a housing, a transparent pane swept over by the feed mixture, a sensor head with an NIR sensor for reflected spectra and an NIR light source and at least one calibration surface and the sensor system can be switched between a pane scanning position and a calibration position, wherein the sensor head with its sensor in the housing is actively moved back and forth relative to the pane by a movement drive in the housing between the scanning and calibration positions, and that the respective calibration surface is given an appearance which differs from the appearance of the feed mixture on the pane.

27. Method according to claim 26, wherein:
the sensor head is selectively adjusted in more than one calibration position relative to a first calibration surface and at least one second calibration surface, which is respectively stationary in the housing, with mutually differing appearances differing from the appearance of the feed mixture on the pane.

28. Method according to claim 26, wherein:
the calibration position the calibration surface is scanned continuously between approximately 2 to 10 seconds, whereas in the scanning position the pane is scanned regularly clocked, and that at least after the determination of the feed values and/or the mixing accuracy a further measurement is carried out.

* * * * *